United States Patent [19]
Harrison

[11] Patent Number: 5,844,562
[45] Date of Patent: Dec. 1, 1998

[54] METHOD FOR HI-FIDELITY GRAPHIC RENDERING OF THREE-DIMENSIONAL OBJECTS

[75] Inventor: Jay P. Harrison, Walled Lake, Mich.

[73] Assignee: Deneb Robotics, Inc., Auburn Hills, Mich.

[21] Appl. No.: 672,704

[22] Filed: Jun. 28, 1996

[51] Int. Cl.⁶ .................................................. G06T 17/00
[52] U.S. Cl. ............................................................ 345/419
[58] Field of Search ................................. 395/119–130; 345/419–430

[56] References Cited

U.S. PATENT DOCUMENTS 4,586,038  4/1986  Sims et al. .............................. 395/130
4,727,365  2/1988  Bunker et al. ........................... 345/139

*Primary Examiner*—Almis R. Jankus
*Attorney, Agent, or Firm*—Rader, Fishman & Grauer PLLC

[57] ABSTRACT

A system for high-speed, high-fidelity three-dimensional graphic rendering includes representing an object in three-dimensional form using a plurality of polygons. Selected views of the multi-polygon rendering are then transformed into single image mapped polygons using texture maps to represent the three-dimensional features of the object. The single image mapped polygons are dynamically displayed in place of the multi-polygon renderings for the selected views, without requiring any outside user input. This system allows increased rendering speed and smoother animation without sacrificing graphic detail.

10 Claims, 3 Drawing Sheets

METHOD FOR HI-FIDELITY GRAPHIC RENDERING OF THREE-DIMENSIONAL OBJECTS

TECHNICAL FIELD

This application relates to computer generated graphics and more particularly relates to computer generated graphics which simulate motion in a three dimensional environment.

BACKGROUND OF THE INVENTION

Many computer applications are concerned about the simulation of three dimensional space and simulated movement of objects within that space. One field which relies highly on computer simulation of three dimensional space and movement of objects therein is the field of robotic simulation. Robotic simulation is primarily an outgrowth of needs in the robotic industry to create, in a safe and efficient manner, programs for production robotics used in a mass production setting. In production settings, robots are used to manipulate items through mass production processing. In the dawn of robotic technology, the robots were programmed on the factory floor to move through a predetermined number of motions. If any errors or "bugs" existed in the software, the robot might move in a manner which would damage or destroy itself or property within its path. Thus, an entire industry arose which allows three dimensional, robotic movement to be simulated on the display device of a computer. Thus, any software errors can be easily detected and corrected before the software is installed in a robot on the factory floor.

Any generation and visual display of simulated objects on a computer display screen is known as rendering, which is generally defined as the art of image simulation on a display device. Depending upon the complexity of the geometric data (which defines the object to be displayed), rendering times vary. For example, the rendering of extremely complex geometric shapes requires much more time than does the rendering of simple geometric shapes. Rendering times affect animation rates. Animation is generally defined as the perceived motion achieved through the sequential rendering of multiple frames of images.

The shorter the rendering time, the smoother the animation and consequently the more interactive the communication between the user and the computer. Ideally, scientists and engineers strive to create the most interactive environment available with which to design and test complex parts and processes.

Rendering speeds are commonly measured in units of polygons per second. This is because the polygon is most often used as the least common denominator for the rendering of geometric data. For example, the depiction of a table set forth in FIG. 1 can be expressed in terms of thirteen, four sided polygons.

The table depicted in FIG. 1 merely a single, extremely simple object and it is often the case that a plurality of much more complex objects must be rendered. Computer aided engineering design geometry attempts to mimic, as close as possible, the accuracy of its physical counterpart. Thus, it is not uncommon when modeling the natural curvatures of complex physical shapes to generate geometric data which represents hundreds of thousands of polygons. When objects comprised of this tremendous complexity are submitted for rendering, interactivity is adversely affected.

This loss of interactively has spawned the formulation of many types of detail-management algorithms. These algorithms share a common goal inasmuch as they reduce the number of polygons that must be rendered. The reduction algorithms are based on two primary considerations:

1) objects located at a distance do not need to display the same amount of detail as proximate objects, and
2) small objects do not need to be depicted in as great of detail as larger objects.

Utilizing these algorithms results in replacing complex objects by more simpler ones (less polygons). If the implementation of these algorithms is successful, the interactivity will be increased because there will be less polygons to render. It is not unusual to obtain a 2-1 reduction in polygons using a detail-management algorithm. However, detail-management algorithms are not without their drawbacks.

Specifically, engineering applications often require extremely accurate visualization and analysis. Because detail-management algorithms, by their nature, alter the shape of the object, they can be problematic for the following reasons:

1) The new, simplified object is not a true representation of the original data.
2) The simplified representation does not look as same as the original object.
3) The simplified representation requires additional memory to store, sometimes more memory than the original object (due to the fact that it is not unusual to construct multiple representations of varying detail).
4) The alternate representation must be manually constructed.

Thus it is an object of this invention to set forth a hi-fidelity rendering system that generates a true representation of original geometric data without sacrificing rendering times or animation rates.

DETAILED DESCRIPTION OF THE PREFERRED EMBODIMENTS

The hi-fidelity rendering system of the present invention does not suffer from the limitations mentioned above relating to detail-management of algorithms. The system of the present invention maintains visual fidelity to the original object through the use of texture maps. Before texture maps are explained and their use in the present invention is illustrated, a brief description of the steps typically employed by any rendering software program will now be explained.

Figure 2A:
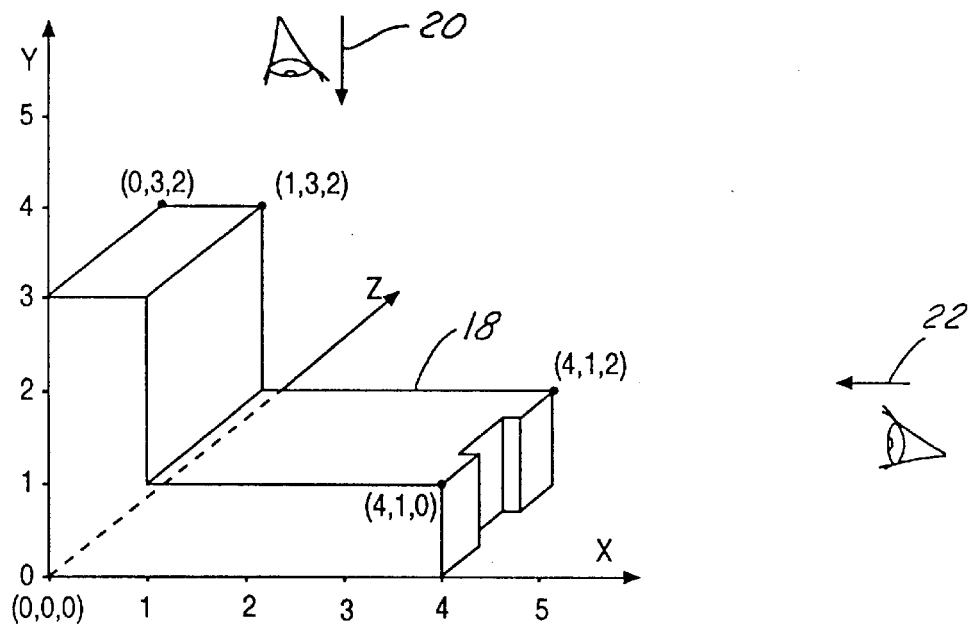
FIG. 2A is an isometric view of a bracket.
Figure 2B:
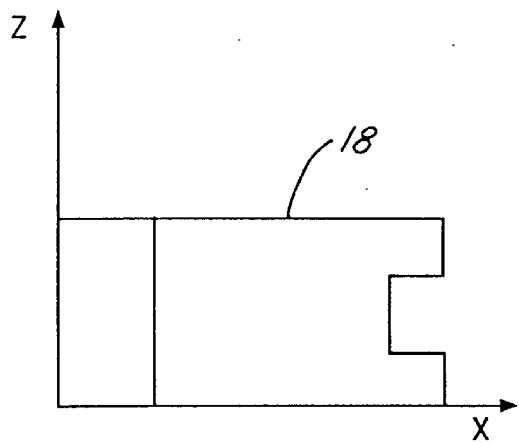
FIG. 2B is a top view of the bracket of FIG. 2A.

Let us assume that the three dimensional device depicted in FIG. 2A is a bracket and it is the subject of our rendering. The bracket can be oriented in three dimensional space (using three orthogonal axes), and all critical points needed to define the bracket can be specified. For example, four of the bracket's corner points are defined in FIG. 2A using conventional Cartesian coordinate conventions. By assigning an x, y, and z value to each critical point on the bracket, its geometrical shape can be fully defined and, accordingly, can be rendered from any vantage point, and or any distance. For example, if the viewer wanted to rotate the bracket of FIG. 2A to be viewed from the top (see reference numeral 20 of FIG. 2A), such a desire would be conveyed to the computer system (using any conventional approach such as a mouse, keypad, etc.). Next, one of any well known algorithms would be implemented to project each one of the points defining bracket 18 into a plane which is orthogonal to the viewing line 20. These projected points would then be interconnected (again by using any number of well known algorithms) to generate the image of FIG. 2B. Thus, the viewer would see the image of 2B which represents bracket 18 when viewed along direction 20.

Figure 2C:
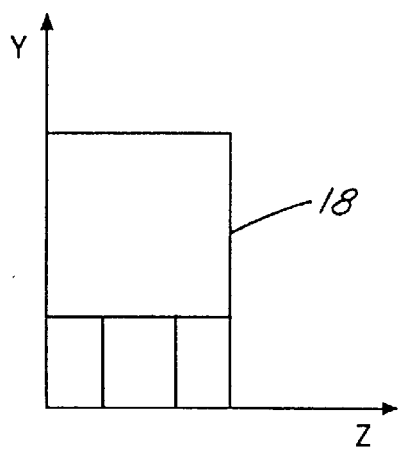
FIG. 2C is a right side elevational view of the bracket of FIG. 2A.

Analogously, should the user wish to view bracket 18 along direction 22 (see FIG. 2A), such a command would be given and all of the critical points defining bracket 18 would be projected in a plane perpendicular to viewing line 22. These points would then be interconnected and displayed on the computer screen generating the rendering of FIG. 2C.

Thus, the steps employed in the prior art rendering process can be summarized as follows:

(A) Defining a three dimensional object using points, lines, and/or planes;

(B) Defining a line of view from which the object is to be rendered;

(C) Projecting the points, lines, and planes from their three dimensional frame into a two dimensional frame (plane) perpendicularly to the selected line of view;

(D) Rendering the object in two dimensional space using the projected data.

Hi Fi Rendering—Theory

The key to the success of the hi fidelity rendering of the present invention lies in its use of texture maps. A texture map (or sometimes known as an image map) is a method of rendering any arbitrary image on the surface of a polygon. It is important to note that when an image is depicted as residing on a surface of a polygon that it does not possess depth (or a third dimension). For example, a polygon can be rendered with a gradient shade to simulate lighting attenuation across the face of the polygon. This gradient shade does not, in any way, add to the complexity of the geometric object to which it is applied thus, the use of gradient shading does not substantially increase the rendering time associated with rendering the object. Use of textured maps to implement shading effects is well known to those skilled in the art of graphic rendering.

If a surface can be "shaded" to simulate lighting attenuation, it can be "shaded" to simulate its three dimensional counterpart when viewed from a specific viewing angle (or more specifically when viewed from a predetermined range of viewing angles).

Hi Fidelity Rendering—Generally

During the rendering process, each object is analyzed to determine whether it fits within the parameters specified by the user. These parameters include object size, object position, distance from the viewer, and angle from the viewer.

If an object is found to conform to the user specified criteria, it is projected into two dimensions based on the current viewing parameters (mentioned above), and its image is dynamically added to a list of objects to be displayed (known as an object definition list).

This new image mapped object will then be used in the rendering process instead of the polygons that it represents, as long as the object falls within the user defined parameters. Because of the hi-fidelity of the image map, the user perceives no change in the geometric representation of the original object. Furthermore, no changes, manual or automatic are done to the data representing the original object, thus allowing this technique to be used in engineering applications. Geometric object memory requirements are also unaffected due to the fact that no additional (intermediate) geometry is being created.

It is important to note that the projecting of the object from its three dimensional frame to its two dimensional frame is done dynamically and accordingly there is no interaction which must take place by the programmer or any "decisions" which must be made by the system user. Accordingly, one of the true strengths to the present invention is that it is truly dynamic and operates completely unseen by the user.

Figure 1:
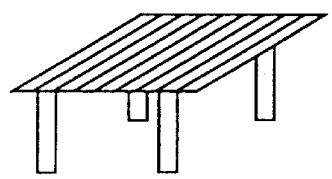
FIG. 1 is a isometric view of an image of a table as displayed on a graphic display terminal.
Figure 3:
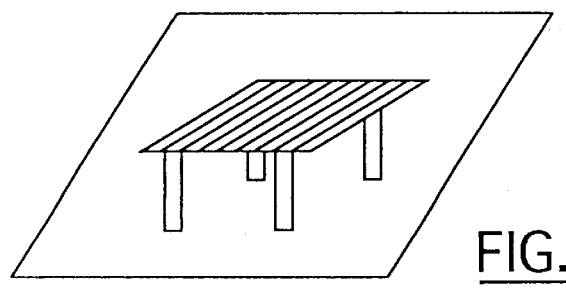
FIG. 3 is a transformation of the table of FIG. 1 into its bitmap graphics counterpart.

For example, in the table represented in FIG. 1, it was mentioned earlier that such a table can be depicted using thirteen polygons. However, this same object can be rendered utilizing the hi-fidelity technique of the present invention resulting in only one image mapped polygon shown in FIG. 3. The algorithm of the present invention will accept an object consisting of any number or polygons, and reduce them to one thereby giving a 2-1, 10-1, 100-1, or infinite reduction in the number of displayed polygons. This technique improves interactiveness dramatically, and allows engineers to work on complex data sets which would otherwise be unwieldy or impossible to interactively work with on a meaningful basis.

Hi Fidelity Rendering—In Detail

The hi-fidelity rendering of the present invention is achieved by employing a three step conditional process during the rendering (also known as the display) phase of a simulation or animation system. The first stage of the process iterates through every object in the viewer's current field of view (i.e. viewer's frustum) using the graphical object display list, to determine whether the object should remain in a full level of detail representation, or based on user controllable parameters, undergo a Level Of Detail (LOD) transformation.

The parameters which are evaluated to determine whether or not to employ the hi-fidelity technique of the present invention are typical to those employed by LOD reduction algorithms in general. The LOD algorithm typically factors the size of the object, and the distance from the viewer's eye (projected onto the computer generated scene, with tolerances defined by the user). Also typically included is an intelligent override which prevents certain objects (such as those that are moving) from ever being considered for reduction. This override is necessary to prevent rapid image map regeneration at every render cycle due to an internally dynamically changing object. If the hi-fidelity process of the present invention were employed without some type of intelligent override, the performance benefit of the present hi-fidelity algorithm may be compromised because of the frequency with which some image map objects would have to be regeneration.

Figure 4:
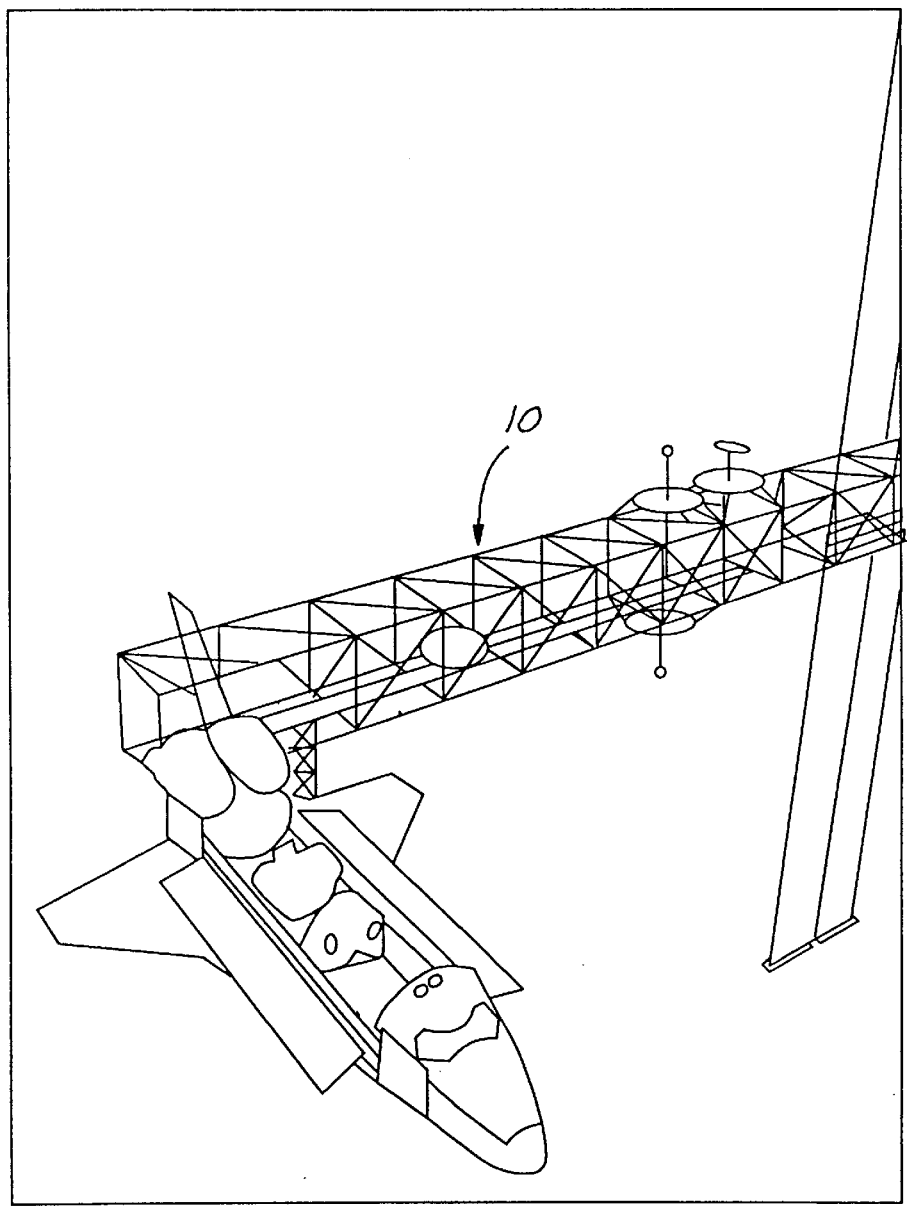
FIG. 4 is a three dimensional graphical depiction of a spacecraft having a cargo bay portion.

Now referring to FIG. 4, in an example of the first stage of the hi-fidelity system of the present invention, FIG. 4 depicts various objects in the cargo bay of a spacecraft. In this rendering, the objects in the cargo bay are possible candidates for hi-fidelity rendering because the objects are small relative to the overall model and they don't move (unlike the cargo bay loading arm 10). The hundreds of polygons representing objects in the cargo bay can be replaced by a single polygon containing a transformation of the representative polygons.

In the first stage of the process, the LOD algorithm determines if any three dimensional polygonal object(s) in the scene can benefit from the hi-fidelity process. If so, the second phase is employed. The second phase of the hi-fidelity process is the hi-fidelity level of detailed image generation. This process first examines the object to determine whether an existing hi-fidelity representation exists. If it does, the hi-fidelity generation parameters are analyzed to determine whether the existing hi-fidelity representation (image map) is suitable for the current viewing frustrum parameters, inasmuch as the user may have changed his viewing position since the parameters were last generated. If the image map is found to have been generated within the user's supplied tolerance for distance, size, and regeneration angle, the existing image map polygon is prepared for rendering by rotating it so that it remains normal to the viewer's line of vision. If the existing image map no longer conforms to the user's specifications, or there was no existing hi-fidelity representation for the object, the hi-fidelity level of detail generation system creates a virtual view port parametrically identical in every way to that which is currently being used to display the three dimensional object on the computer graphic display, except that it is created in an off screen (i.e. memory) location.

Figure 5:
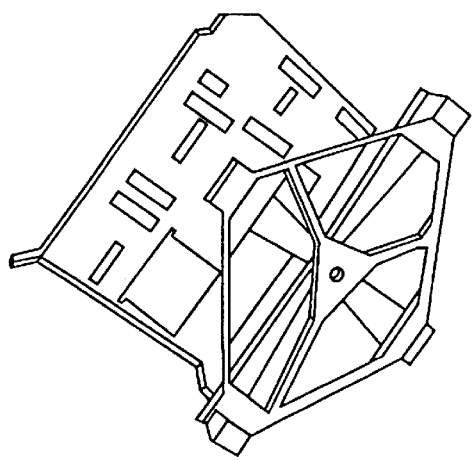
FIG. 5 is an enlarged view of the cargo bay portion of the depiction of FIG. 4.

For example, in our current example, the cargo bay section has been separated from the remaining portion of FIG. 4, and is rendered alone (see FIG. 5). This allows full detail to be captured for the replacement image. Also, care is taken to ensure proper visual orientation and perspective effect for image reinsertion.

Thus, the depiction of FIG. 5 represents the polygonal object (cargo bay contents) separated from the three dimensional scene of FIG. 4 and transformed and rendered to a virtual, non-viewable display.

The resultant single-object rendering is then read into memory as an image bitmap. The background area surrounding the rendered object is filled with an alpha channel value which indicates transparency. This effectively makes the rendered object a "cutout" which allows placement in a scene without a visible rectangular border surrounding the object. This resultant image map (a collection of pixels which forms and image) is then stored in the graphics display subroutine memory. A single polygon used to house the image map is then constructed which conforms to the bounding areas surrounding the original object, and is rotated such that the face containing the image map occupies the same visual location as the original polygonal representation. A pointer to the image mapped polygon is then stored along with the original polygon representation of the object for later use.

Once the hi-fidelity level of detail representation has been made, it is used in the next render cycle instead of the full polygon representation, affording significant reduction in computation time, and therefor increased rendering speed. The underlying geometric data description is still maintained and available for engineering analysis.

Figure 6:
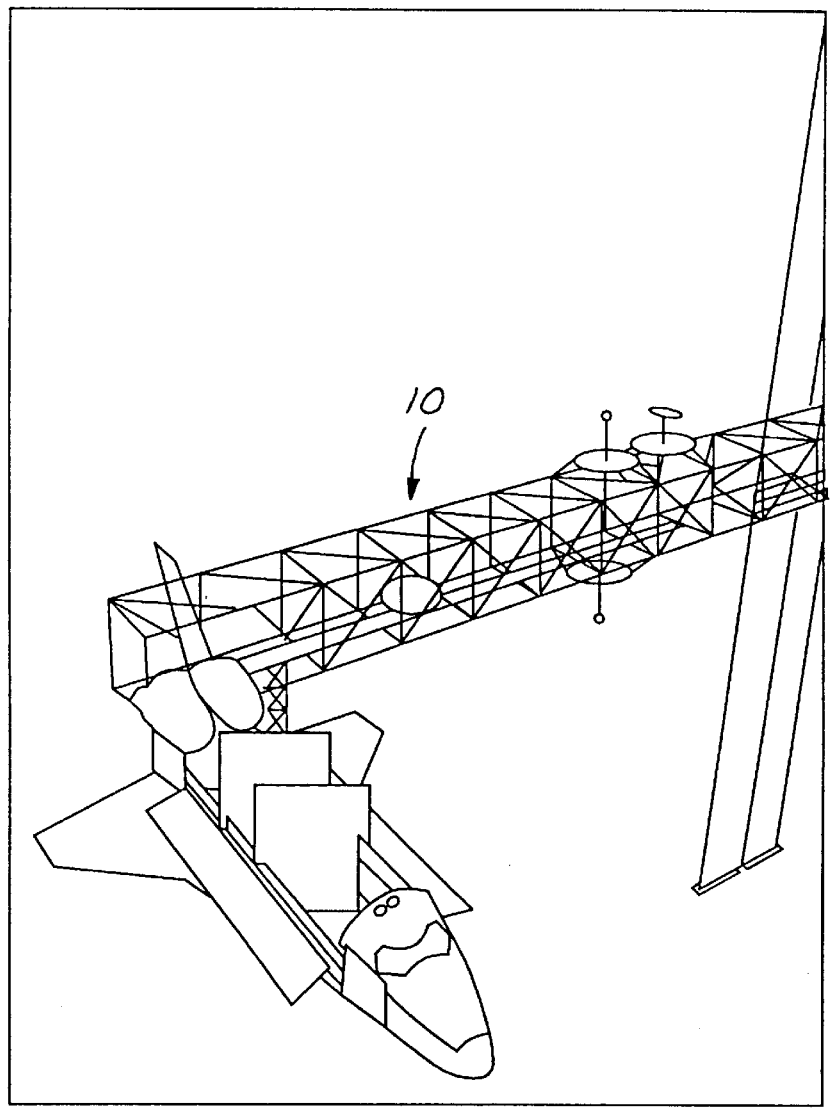
FIG. 6 is a depiction of the spacecraft of FIG. 4 wherein the cargo bay portion of the depiction has been excised.

As seen in FIG. 6, the resultant image map polygon is inserted into the scene instead of the original complex polygonal representation (for purposes of illustration in FIG. 6, the image mapped, alpha blended polygons are shown in black). There is little or no visual change in the representation of the object as shown in the rendering of FIG. 6.

While the forgoing description of the invention has been made with respect to the preferred embodiments, a person skilled in the art will understand, in light of the present disclosure, that numerous changes, modifications, and alterations may be made therein without departing from the spirit and the scope of the appended claims. Therefor, all such changes, modifications, and alterations are deemed to be within the scope of the invention as defined in the following claims.

I claim:

1. A method of operating a digital computer to render an object on a display terminal, comprising the steps of:
    A. storing a first data set representing said object in three-dimensional space,
    B. displaying said object as represented by a plurality of polygons,
    C. dynamically analyzing a plurality of parameters to determine whether said rendered object of step (B) should undergo a transformation,
    D. creating a virtual view port currently used to view said object,
    E. dynamically transforming said first data set into a second data set, wherein said second data set defines a single image mapped polygon representing said object in three-dimensional space,
    F. dynamically displaying the single image mapped polygon of said object in place of the image as represented by a plurality of polygons.

2. The method of claim 1, wherein said plurality of parameters includes at least one parameter selected from the set of distance, size, and regeneration angle.

3. The method of claim 1, wherein step (E) further includes filling a background area of said single image mapped polygon with indicia indicating transparency.

4. A method for using a computer readable storage device to direct a computer to render an object on a display terminal, comprising the steps of:
    A. storing a first data set representing said object in three-dimensional space,
    B. rendering said object as represented by said data
    C. analyzing a plurality of parameters to determine whether said object should undergo a transformation,
    D. dynamically transforming said first data set into a second data set, wherein said second data set defines a single image mapped polygon representing said object in three-dimensional space,
    E. rendering the image mapped polygon of said object in place of the object rendered in step (B).

5. The method of claim 4, wherein said plurality of parameters includes at least one parameter selected from the set of distance, size, and angle.

6. The method of claim 4, wherein step (D) further includes filling a background area of said single image mapped polygon with indicia indicating transparency.

7. The method of claim 4, further including the step of
    F. creating a virtual view port currently used to view said object.

8. A process for rendering an object on a display terminal, of a graphics display computer, comprising the steps of:
    A. storing a first data set representing said object in three-dimensional space,
    B. dynamically analyzing a plurality of parameters to determine whether said object should be rendered to said terminal using said first data set or a second data set that is a transformation of said first data set,
    C. transforming said first data set into said second data set, wherein said second data set defines a single image mapped polygon representing said object in three-dimensional space,
    D. displaying the image mapped polygon of said object in place of the image as represented by a plurality of polygons.

9. The method of claim 8, wherein said plurality of parameters includes at least one parameter selected from the set of distance, size, and regeneration angle.

10. The method of claim 8, wherein step (C) further includes filling a background area of said single image mapped polygon with indicia indicating transparency.

* * * * *